United States Patent [19]

Parker et al.

[11] Patent Number: 4,750,975

[45] Date of Patent: Jun. 14, 1988

[54] VAPOR/LIQUID CONTACT COLUMN STRUCTURE

[75] Inventors: Trent J. Parker; Byron M. Parker, both of Salt Lake City, Utah

[73] Assignee: Uni-Frac, Inc., Salt Lake City, Utah

[21] Appl. No.: 840,134

[22] Filed: Mar. 17, 1986

[51] Int. Cl.⁴ .................... B01D 3/26; B01D 3/42
[52] U.S. Cl. ........................... 202/154; 202/158; 202/237; 202/264; 261/75; 261/148; 203/1; 203/20; 203/DIG. 18
[58] Field of Search ............... 202/158, 237, 264, 162, 202/154; 203/1, DIG. 14, 20, DIG. 18, 4, 40; 261/75, 146, 148; 55/36

[56] References Cited

U.S. PATENT DOCUMENTS

| | | | |
|---|---|---|---|
| 2,306,367 | 12/1942 | Benson et al. | 261/113 |
| 2,804,941 | 9/1957 | Hutchinson | 202/158 |
| 2,847,200 | 8/1958 | Ung | 202/158 |
| 2,965,548 | 12/1960 | Hachmuth | 202/158 |
| 3,151,042 | 9/1964 | Koshoot | 202/158 |
| 3,233,389 | 2/1966 | Dahlen | 202/158 |
| 3,410,540 | 11/1968 | Bruckert | 261/113 |
| 3,417,975 | 12/1968 | Williams et al. | 261/114 JP |
| 4,089,752 | 5/1978 | Hancock | 202/158 |
| 4,159,291 | 6/1979 | Bruckert et al. | 202/158 |
| 4,496,430 | 1/1985 | Jenkins | 202/158 |
| 4,499,035 | 2/1985 | Kirkpatrick et al. | 202/158 |
| 4,547,326 | 10/1985 | Weiler | 261/114 R |
| 4,582,569 | 4/1986 | Jenkins | 202/158 |
| 4,603,022 | 7/1986 | Yoneda | 202/158 |

FOREIGN PATENT DOCUMENTS 0949444 6/1974 Canada .................. 261/114 R

OTHER PUBLICATIONS

Lewis, Jr., "Rectification of Binary Mixtures", M.I.T., Apr. 1936, pp. 399–402.
*Fractionation and Towers*, Petroleum Refining Engineering, Fourth ed., pp. 481–485.

Primary Examiner—S. Leon Bashore
Assistant Examiner—V. Manoharan
Attorney, Agent, or Firm—Kenyon & Kenyon

[57] ABSTRACT

Vapor and liquid contact structure for distillation, fractionation, rectification, absorption, and the refining, in a column, of various liquid materials such as petroleum, chemical, and alcohol solutions. Provision is made for the inclusion of vertically-spaced bubble plate chambers, having respective liquid/vapor contact devices, to accommodate contact of counter-current flows of reflux liquid and vapors. Downcomer means including slanted ramps, disposed outside of the vapor conduit-defining interior, define elongate downcomer structure for liquid flow and thereby, i.e., by such slanted construction, reduce froth or foam passing to a next lower contact device, eliminating unwanted counter-current gas entrainment between contact devices. Liquid flow rates over exit weirs beyond 30 gpm/inch are obtained. Downcomer reflux reservoir depth can be adjusted by an adjustable gate proximate the slot opening to a given contact device. Descending reflux liquid flow is kept outside of primary vapor flow, secondary vapor evolving from descending reflux being conducted circuitously back into the primary vapor flow for ascent to the next-above contact device. Plate efficiency is enhanced through maximum plate-area effective use and unidirectional liquid-flow over such plates; inter-plate vapor flow is unobstructed. Column sections are constructed in essentially identical modules which can be stacked and secured together to reduce fabrication and engineering costs.

13 Claims, 3 Drawing Sheets

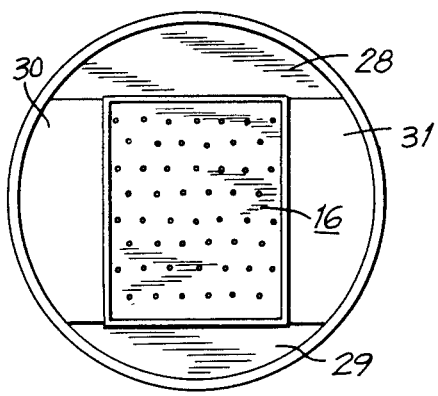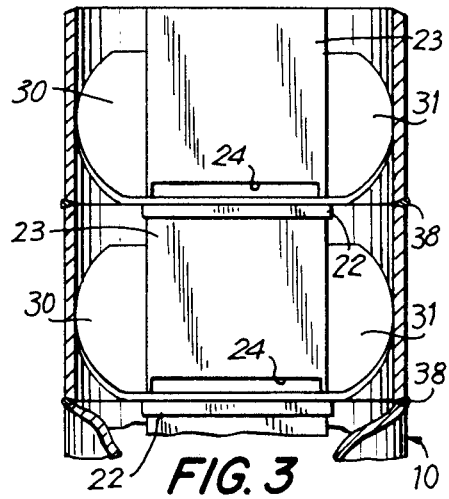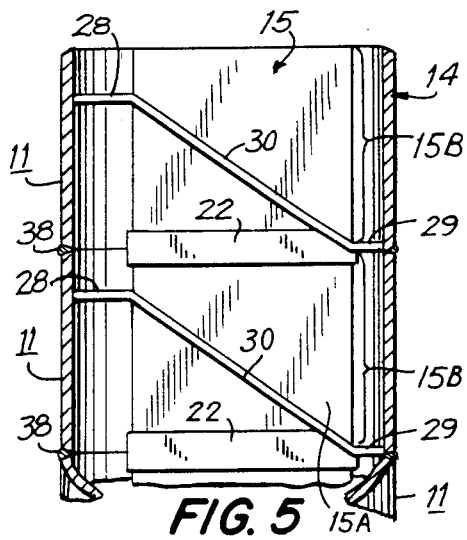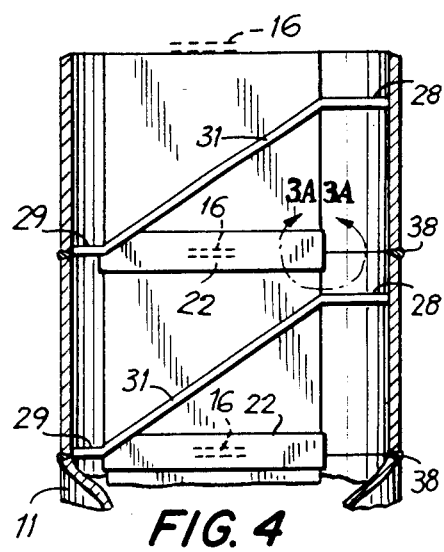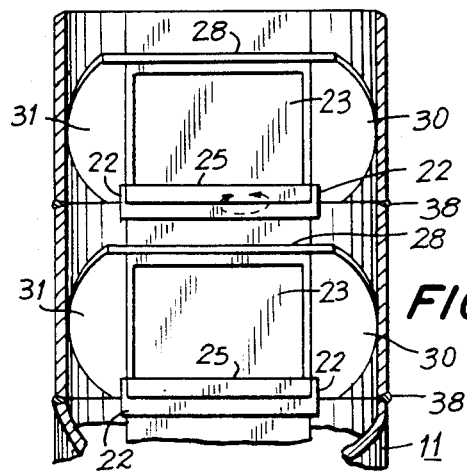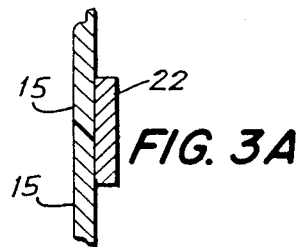

VAPOR/LIQUID CONTACT COLUMN STRUCTURE

FIELD OF INVENTION

The present invention relates to columns such as a fractional distillation column structures and, more particularly, provides improved structure for increasing efficiency of vapor-and-liquid contact column operation.

BRIEF DESCRIPTION OF PRIOR ART

The patent literature as relates to bubble plates or contact devices, fractionation or rectification columns, and so forth, is quite developed though no such literature is currently known to the inventors which is directly related to the subject invention as claimed. The problem presently confronting the industry is one of increasing efficiency of a column without incurring substantial increases in fabrication and operating costs. A hint of part of what can be done by changes in internal design of columns is given in a paper generated 50 years ago at the Massachusetts Institute of Technology entitled *Rectification of Binary Mixtures* by W. K. Lewis, Jr., of that institution, publication date at M.I.T. April 1936. At page 400 of such publication there is illustrated the concept that, for stacked bubble trays or contact devices, efficiency is enhanced where liquid flow is in the same direction over each tray. The publication, however, does not consider how descending reflux liquid can be conducted other than in an enclosed downcomer diagonally through the space directly between the plates; nor does it consider how the substantial vapor content in foam, of the descending reflux liquids, can escape back into the primary vapor path. Such vapor entrained in the reflux, of course, defeats most of the suggested theoretical efficiency of unidirectional reflux liquid flow over the contact trays. Also, the downcomer causes a structural obstruction in the contact chamber, further negating the suggested theoretical efficiency of unidirectional flow.

For ease of discussion of the present invention, the term "contact chamber" shall be used to describe the inner chamber separating the vertically-spaced bubble contact trays. The term "contact tray" or, generically, "contact device", shall be used to idnetify any one of a variety of trays used in, e.g., distillation towers and columns and which can be enployed in the present invention, to-wit: sieve trays, valve trays, bubble cap trays, etc. The term "downcomer" shall be used to describe the means of conducting reflux liquid from one tray, or "contact device", to the next lower tray. It shall also be used to describe the space outside the contact chamber and inside the column shell that serves for conducting descending liquid in the present invention. The term "downcomer reservoir" shall be used to describe the reflux pool held back in the downcomer for defoaming prior to entering into the next lower contact chamber and prior to side draw cuts being taken.

Certain types of downcomer structures and tray designs have been suggested by a number of authorities to increase liquid flow rates and to tend to minimize loss of efficiency of vapor-and-liquid contact devices. See examples cited in Chapter 16 entitled *Fractionation and Towers*, Petroleum Refining Engineering, Fourth Edition at pages 480-483 and in Chapter 6 entitled *New Fractionating-Tray Designs*, from the work "*Advances in Petroleum Refining and Chemistry*", Volume I, at pages 277-334.

No means, since the publication date of these articles to the knowledge of the inventors, have been devised to carry forward such germ ideas to the extent of the present invention in devolving practical structure. Also, nowhere in any literature, of which the inventors are aware, is there disclosed any means or teaching whatever of accomplishing unidirectional flow across contact devices in a vertical column in a manner such that descending reflux liquid does not interfere with upwardly ascending vapors between contact trays; nor is there indicated in the prior art, of which the inventors are currently aware, of the teaching of using rectangular contact tray areas in vertical columns for maximum use of effective vapor-liquid contact, and also the teaching of fabricating substantially identical column sections of equivalent design, with each fitted with custom-engineered, rectangular contact trays so that the vertical columns herein may be made from modules to fit needed column or tower, engineering-design profile. Furthermore, there is nothing in the teachings in the prior art of the concept of providing elongated ramp-type downcomer structures so as to create essentially quiescent downcomer de-foaming reservoirs prior to almost pure liquid introduction into a next succeeding contact chamber and onto its bubble tray. This increases liquid throughput capacity, saves heat energy, and reduces need for side-stripper columns and/or processes. In short, the above makes the contact column of the present invention more cost-efficient.

BRIEF DESCRIPTION OF PRESENT INVENTION

The present invention provides, e.g., a fractionation column, distillery column, absorption column, etc., and sectors thereof, comprising a series of generally uniformly constructed contact modules fitted with contact trays pre-engineered for the desired vapor capacity that can be easily assembled one on top of the other into a complete column prior to shipment to use site. Fabricating columns of basically identical modules that contain custom-engineered contact trays, as taught herein, results in manufacturing cost being lower or at least comparable to present column costs. The individual sections are designed such that the path of descending reflux liquid is outside of the ascending primary vapor stream progressing through one contact tray upwardly into the next contact chamber. Furthermore, elongated ramps are provided the downcomer structure so as to deter froth and/or foam buildup choking the downcomer to the next lower chamber. Also, structure is provided for permitting ascending secondary vapors evolving from downcomer reflux reservoirs to rise counter-current relative to the reflux liquid so as to ascend into the contact chamber between vertically adjacent vapor-and-liquid contact trays, and to proceed with the primary vapor stream upwardly through the next upper contact tray. The contact tray and the contact chamber area between contact trays is maintained in an unobstructed condition so as to maximize vapor-flow efficiency. Additionally, reflux liquid flows uniformly across the contact trays in the same direction at all levels, thus further enhancing contact tray efficiency. Theoretical studies indiciate 15% to 40% increased efficiency for unidirectional reflux liquid flow. Tests have indicated that the present invention operates in a manner superior to prior designs so far as capacity and operating range are concerned. Column capacity to flood is materially extended. Tests have likewise indicated the unique ability of the present still or column to operate at wide ranges of liquid and vapor ratios with low pressure drop, further extending the flood curve and operating range.

The present invention will apply to petroleum distillation, fractionation, alcohol distillation or rectification, absorption, and indeed, wherever resort is to be had, of in effect separating or combining liquids and semi-liquid materials. It should be noted that by the invention, engineering and capital costs of construction as well as operating costs and heat energy use are substantially reduced over prior art structures.

OBJECTS

Accordingly, a principal object of the present invention is to provide a new and improved vapor-and-liquid contact column and components thereof.

A further object is to provide a structure for a more cost-efficient separation of various liquids, semi-liquids, and gases into nearly pure fractional compounds and for absorption of gases into liquids.

An additional object is to provide a downcomer structure with an elongated sloping path and reservoir means for reflux liquid to maximize defoaming, defrothing, and degassing of reflux liquid.

An additional object is to provide a structure with outside control for varying the depth of reflux liquid within downcomers forming downcomer reservoirs.

An additional object is to provide for reservoir in downcomer structure from which vapor-free reflux liquid is introduced onto next succeeding contact tray.

An additional object is to provide downcomer reservoir from which vapor-free liquid can be drawn as product, negating need of side cut stripper columns, pumps, etc.

A further object is to provide a structure in columns of the type described which will conduct secondary vapor generated by degassing of liquid in downcomer, back into the primary vapor flow within a contact chamber.

A further object is to provide structure having a series of vertically-spaced contact chambers so arranged that vapor flow between such chambers is unimpeded by downcomer reflux liquid carrying structure.

An additional object is to provide in a column the series of vertically-spaced contact trays that reflux liquid flow thereover is unidirectional.

An additional object is to provide means for installation of customer engineered and designed contact trays for desired vapor flow capacity to achieve optimum pressure drop between successive chambers.

An additional object is to provide a contact column whereby each vertically-spaced contact tray can have different vapor flow capacity and thereby make possible for heat-removal from the top of the tower and by side-cut products without enlarging the top diameter of the column, without resorting to pump-around and pump-back streams lower in the tower.

An additional object is to provide a tower section structure of essentially identical modular units which can be stacked and secured together in a desired tower column.

BRIEF DESCRIPTION OF THE DRAWINGS

The present invention may be understood by reference to the following description, taken in connection with the accompanying drawings in which:

FIG. 2 is a top plan of a representative one of the column sections and is taken along line 2—2 in FIG. 1.

FIG. 3 is a front view of a pair of sections in the structure of FIG. 1, broken away, and is taken along the arrow 3 in FIG. 1.

FIG. 4 is a right side elevation, partially broken away, and taken along the line 4—4 in FIG. 1.

FIG. 5 is a left side elevation, is partially broken away, and is taken along the line 5—5 in FIG. 1.

FIG. 6 is a rear view of the pair of sections illustrated in the column FIG. 1 and is taken along the arrow 6 in FIG. 1.

FIGS. 2-6 and 11 are shown in reduced scale.

DESCRIPTION OF PREFERRED EMBODIMENTS

Figure 1:
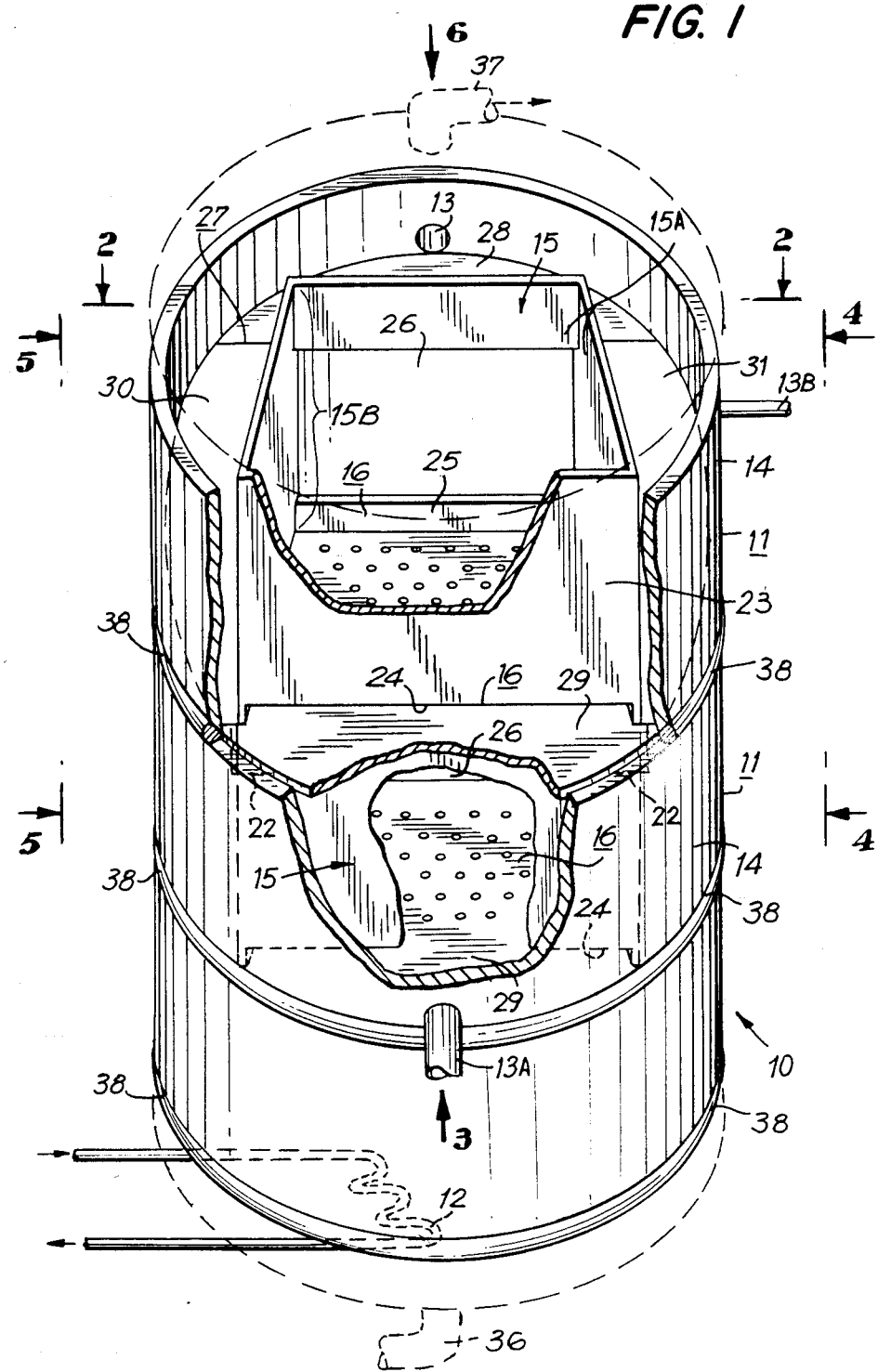
FIG. 1 is the frontal perspective of a column incorporating the features of the present invention, is shown partially broken away, and indicates two of the several essentially similar sections of the column that can be stacked and secured together.
Figure 7:
FIGS. 7, 8, and 9 are details taken along the arcuate line 7—7 in FIG. 6, illustrating a few of various forms of construction that the individual bubble trays or contact devices used may take.
Figure 8:
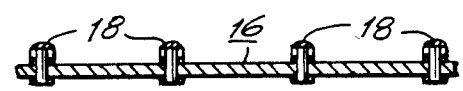
Figure 9:
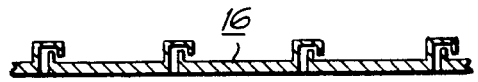

In FIG. 1, column 10 is shown to comprise a multi-stage device having a series of sections 11 which may be identical or substantially similar in construction and constructed to fit together in stacked relationship. Column 10 can include a heat source 12 when that is desired as it would be in some chemical and alcohol distillation processes. Any modular section can be fitted with a feed line inlet 13, a liquid draw line 13A or steam injection line 13B as illustrated in FIGS. 1 and 11. The individual sections 11 will include a shell or wall enclosure 14 surrounding a vertical conduit, comprising a conduit structure 15A including a plurality of vertically stacked chamber stages 15B. Each of the chamber stages 15B is provided with a horizontal liquid-and-vapor "contact tray" 16 which sometimes are also known as bubble trays or contact devices. The contact trays provide a means for developing a shallow pool 20, see FIG. 10, of reflux liquid and then bubbling vapor upwardly through such pool. Contact trays are installed such that they can subsequently be removed and updated for custom-engineered changes in vapor flow capacity. Thus, as seen in FIGS. 7-9, the contact device or tray 16 may include perforations (sieve tray) 17 as seen in FIG. 7; the plates or trays 16 may also include respective bubble caps 18 as in FIG. 8; or the individual contact tray 16 can be the Uniflex tray as in FIG. 9. Such contact devices are sometimes known and sometimes take the form of art known to those in the industry as sieve trays, bubble cap trays, Flexitrays, float valve trays, and Uniflex trays. Suffice to say at this juncture, as to operation, upwardly ascending vapors within the individual contact chamber sections 11 proceed upwardly through the tray such that a portion of the vapors will condense and enrich the progressively upper reflux pools 20, successively, with lighter fractions ascending from lower pools.

Again, the individual chamber stages 15B may be identical in structure, rectangular in form, and be secured together by suitable straps 22, see FIGS. 1 and 5. It is important to note that panel 23 of each chamber or stage will include a lower gate opening or throat 24, see FIGS. 3 and 10, for the admittance of reflux liquid onto the corresponding contact tray. Correspondingly, and at the other end of the contact tray for each stage or section, there will be disposed an exit weir 25 and, thereabove, a rear opening 26 in such contact chamber 15B. Successive chambers 15B form the conduit structure 15A for ascending vapors.

Outside the area of the contact chamber, i.e., outside of but affixed to conduit structure 15A, will be disposed a downcomer structure 27. Each downcomer structure 27 includes an upper portion 28, a lower horizontal portion 29, and interconnecting the two, declining ramps 30 and 31. If desired, but a single declining ramp need be employed; in such event the remaining side will be closed off and/or the outer shell of the conduit section simply made integral with a side of the conduit means.

In any event, and in the embodiment shown, the downcomer structure receives reflux liquid from the next upper chamber at portion 28, and such reflux liquid gradually descends into reflux reservoir 20A along ramps 30 and 31 to horizontal portion 29. The reflux liquid enters the opening or gate 24 to form a pool 20 over the associated contact plate 16. The pool depth can be defined by the inclusion and setting of weir 25. Accordingly, and in operation, reflux liquids descend downwardly along the downcomer structure then proceed over the contact trays 16 by virtue of the reflux pools 20 formed relative to weir 25. Then the reflux liquid overflows the upper edge of weir 25 and through side opening 26; such reflux liquids will descend into the next lower downcomer structure.

Figure 10:
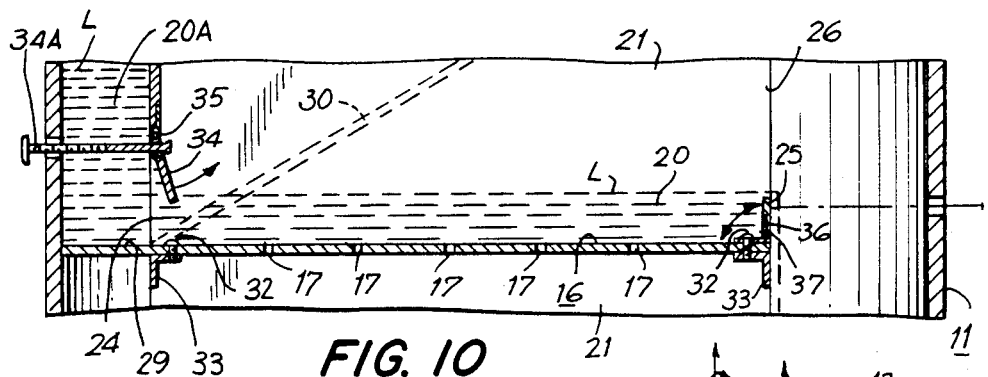
FIG. 10 is an enlarged detail, principally in section, and taken along the line 10—10 in FIG. 11, illustrating adjustable gate and weir constructions.
Figure 11:
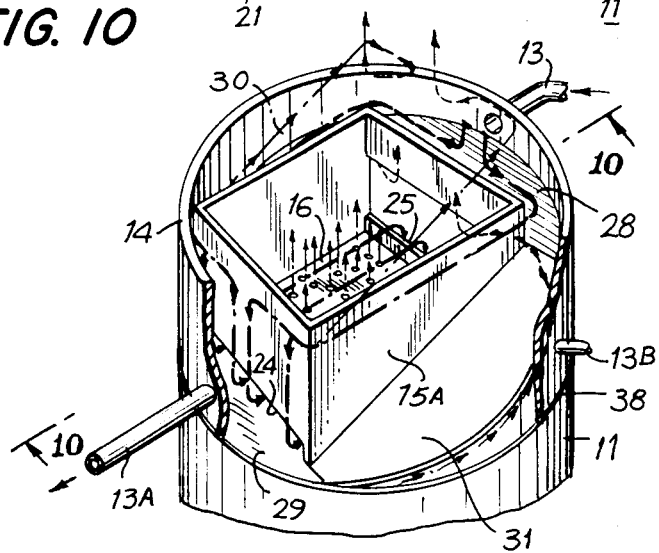
FIG. 11 is a schematic drawing, similar to FIG. 4, but illustrates reflux liquid and vapors flows within a pair of joined sections of the column of FIG. 1.

FIG. 10 illustrates that attachments 32 may be employed to secure the contact devices within their several sections to accommodating brackets 33. These may be included such that the contact trays can be removed when desired, as from the top. Also, FIG. 10 illustrates that opening 24 in FIG. 1, for example, may be formed by adjustable gate 34, see FIG. 10, that is hinged at 35 to the primary structure and moved by control 34A. This is for the purpose of selectively increasing the depth of the downcomer reflux liquid, as at reservoir 20A, and thus increase the pressure of such liquid, whereby to introduce liquid uniformly into the contact chambers; reflux liquid depth in the downcomer reservoir will allow for gradation or zoning of the liquid, i.e., from dense low-level liquid which is essentially gas-free to upper low density liquid levels where gas bubbles are substantially prevalent and susceptible to decay.

FIG. 11 is in schematic form and illustrates the flow of the reflux liquid, the vapors within chamber sections 15B, and also the vapors 30 that ascend from the liquid in the reflux reservoir 20A of the downcomer structure. In the latter case, the downcomer structure provides a gradual settling in of descending reflux liquid into the reflux reservoir proximate opening 24. This in essence forms a generally quiescent zone prior to reaching the mouth of 24 above horizontal portion 29. It is essential that the still or column be operated such that the reflux reservoir 20A level is above the lip defining the top of opening 24, thereby forming a liquid seal and keeping any foam or froth above such reflux liquid. The collapsing of bubbles will produce vapors that will be free to go countercurrent to the reflux liquid, prior to the gradually descending reflux liquid entering opening 24 and the vapor ascending back into one of the contact chamber 15B, then through the associated contact tray 16 into the contact chamber 15B thereabove. Feed line 13, draw-line 13A, steam injection line 13B are also included. Steam-injection may be employed at 13B to lower vapor pressure, at selected still levels, to enchance vaporization.

To be noted is the fact that optimum plate area is employed for vapor-and-liquid contact and to reduce hydraulic gradient across tray 16; also, inter-plate space is unobstructed and unidirectional flow across the several plates is achieved. FIG. 11 illustrates in detail the reflux liquid and countercurrent vapor flow.

Heat can be supplied if needed by a heat source 12 as illustrated in FIG. 1. Bottoms are drawn off and separately processed as indicated at 36. Non-condensed gas and vapors are drawn off at 37 and fed to condensing units and a portion of which is fed back to the column at the top plate thereof as reflux liquid. The column may be made of any number of modules 11 as shown; each module is engineered for the sections to be easily fitted together and seam-welded or otherwise connected at 38. The regulation of pressure between individual contact modules may be had by custom-engineered contact trays for optimum pressure drop and contact efficiency.

The individual sections are constructed such that the upper portion 28 of a respective downcomer structure is positioned below the horizontal level of contact plate 16 from which the reflux liquid is descending, this so that there will be a desired dropping of reflux liquid as the same overflows the weir and descends in the downcomer structure. The elongation and slanted nature of the downcomer ramps of each section serves to minimize gas entrainment, frothing and foaming, relative to the relatively gas-free reflux liquid that descends and gathers at the next lower contact chamber at opening 24. This greatly improves the operating efficiency of each contact device. It is noted that reflux flow and defrothing is kept totally outside of the area of the contact chamber of each module appertaining thereto. Further, contact chamber area is unimpeded by a structure carrying reflux liquid to a next lower chamber. In the invention shown, the reflux liquid path as to its descent through the column is maintained outside of conduit structure 15A. Thus, efficiency is further enhanced as to each section and the combined column.

Finally, it is seen that the downcomer structure is arranged such that over-plate liquid proceeds across each contact device in the same direction, i.e., from left to right as per FIG. 4. This further increases efficiency of the column as explained hereinbefore.

Accordingly, the present invention provides a vertical conduit comprising a conduit structure 15A including a plurality of vertically stacked conduit chamber stages 15B. In a preferred embodiment, each of the conduit chamber stages 15B is of a transverse rectangular cross-section and mounts a rectangular vapor-and-liquid contact tray or device 16, see FIGS. 1 and 11. The conduit structure 15A is arranged to be in correspondence with the contact devices for constraining and conducting vapors emanating from each contact device 16 upwardly. In the structure, the reflux-liquid, slanted downcomer ramps 30, 31 are secured to and spiral, and thus are found spiralling about the conduit structure 15A. The reflux-liquid flow is unidirectional over all of the vapor-and-liquid contact devices 16 due to the configuration of the downcomer structure 27. Indeed, pursuant to the invention, the reflux-liquid path defined by the arrangement and configuration of the wall structure 14, conduit structure 15A, contact devices 16 and the downcomer structure 27 spirals 360° between adjacent, vertically aligned openings 24 of the contact devices 16, as seen in FIGS. 1, 6 and 11. The downcomer ramps 30, 31, with the wall enclosure 14, thus effectively form a countercurrent reflux liquid and gases', 360° progressively redirected reflux flow path about the conduit structure 15A, i.e., a 360° spiralled path, spiralling from one contact device 16 to the contact device 16 next below.

What is provided therefore is a new and useful construction for separation or combining (absorption) of vapors, liquids, fractions, etc., through the employment of contact devices for maximum contact of descending reflux liquid and ascending vapors. Provision is made for minimizing inefficiencies, and for omitting downcomer structure directly above and beneath the contact devices, so as to maximize efficiency of use of such contact devices. Likewise, provision is made for upward ascent of secondary vapors and gases escaping from the reflux liquid outside of the contact chamber, so that such may be reintroduced, beneath the next upper contact device.

While particular embodiments of the present invention have been shown and described, it will be apparent to those skilled in the art that changes and modifications may be made without departing from this invention in its broader aspects, and, therefore, the aim in the appended claims is to cover all such changes and modifications as fall within the true spirit and scope of this invention.

We claim:

1. A vertical column containing countercurrent reflux liquid and vapors, including, in combination, a rectangular, horizontal, perforate vapor-and-liquid contact device having opposite ends; conduit means of transverse rectangular cross-section in correspondence with said contact device disposed above and secured to said contact device for constraining and conducting vapors emanating from said contact device upwardly, said conduit means including a reflux-fluid inlet opening adjacent one of said opposite ends of said contact device and a weir opposite said inlet opening at the remaining one of said ends for forming a reflux-liquid pool over said contact device, said conduit means being provided a vapor-admittance side opening directly above said weir; a downcomer structure exterior of and secured to said conduit means and including a bottom portion adjacent to and connected with said conduit means inlet opening, a top portion positioned over said side opening, and a reflux-liquid slanted downcomer ramp secured to and spiralling about said conduit means, said downcomer ramp with said top portion beginning at a level above said contact device and above said weir and made integral with said bottom portion and said top portion; means for conducting reflux liquid to said downcomer ramp via said top portion; and a wall structure secured about said conduit means in spaced relationship therewith and directly secured to said downcomer structure and defining, with said downcomer structure and said conduit means, a vapor-ascent space beneath said downcomer structure proximate said side opening of said conduit means.

2. A column section constructed for vertical stacking with respect to similar sections, said section including, in combination: a vertical conduit of transverse rectangular cross-section and having upper and lower ends; a corresponding, rectangular vapor-and-liquid horizontal contact device secured to said conduit transversely across said lower end and having an inlet end and an exit end opposite each other, said conduit having an inlet throat opening at and connected with said inlet end and a gases' admittance and liquid discharge opening proximate and above said contact device beneath said gases' admittance and liquid discharge opening thereof; downcomer structure secured to and outside of said conduit and having a lower end connected with said throat, an upper end disposed above said discharge opening, and a sloping ramp joining said lower and upper ends of said downcomer structure; a wall structure disposed about said conduit and secured to said downcomer structure and configured to form therewith a countercurrent reflux liquid and gases', 360° progressively redirected flow path between said wall structure and said conduit; and structural means secured to said conduit proximate said upper opening thereof for joining the conduit of a corresponding external section to said conduit of said section.

3. A vertically stacked column, with reflux liquid froth, and ascending gases and vapors, said column including, in combination: plural, vertically stacked sections each including an inner vertical conduit of transverse rectangular cross-section and having upper and lower ends, an outer housing fixedly disposed with respect to but spaced from and circumscribing said inner conduit, structure securing the vertical inner conduits and the outer housings of said sections in respective registration, said conduits including horizontal, rectangular, vapor-and-liquid contact devices positioned at and connected with their said lower ends in registration therewith, respectively, said contact devices having aligned inlet ends and side-opposite aligned exit ends the latter being provided with respective weirs, said conduits having vertically aligned liquid inlet mouths respectively registering with said contact devices' inlet ends and also vertically aligned gases' exit openings respectively disposed above said weirs, plural, downwardly sloping downcomer means disposed between and secured to each conduit and its respective outer housing for conducting reflux liquid overflow from the said weir of an upper section along a 360° spiralled path to said inlet mouth of the next lower section, said downcomer means also defining an upwardly sloping ceiling partition for vapor flow resulting from the decay of reflux liquid froth from that section next below, between its conduit and outer housing, whereby to conduit said vapor flow upwardly, exterior said central conduit, from the area of said reflux liquid to the contact device of the next higher section via the said opening of said opening's associated conduit.

4. A stacked vertical column constructed for accommodating ascending vapors and gases and countercurrent descending reflux liquid and froth, said column including, in combination: plural, mutually-spaced, vertically aligned, rectangular, horizontal vapor-and-liquid contact devices each provided with mutually vertically aligned outlet weirs, conduit means of transverse rectangular cross-section connected with said contact devices for conducting vapor flow from one contact device to and through a next upper contact device and from thence toward and through a next-upper contact device, said conduit means having gases' admittance wall apertures respectively disposed above said weirs and reflux liquid admittance throats connected to said contact devices at ends thereof opposite said weirs; plural, vertically spaced, spiralling, downwardly sloping downcomer means, laterally disposed exterior of and secured to each of said conduit means, for conducting overflow reflux liquid from each contact device to the next lower contact device along a 360° path such that the liquid flow across each of said contact devices is in the same direction, said downcomer means being constructed to direct, countercurrent vapor and gases' flow as develops through reflux liquid decay exterior of said conduit, over said descending reflux liquid and into said conduit for progression upwardly through progressively higher ones of said contact devices.

5. Structure according to claim 4 wherein each of said contact devices has a reflux liquid inlet end and a side opposite reflux liquid exit end secured to and beneath said weirs, and means secured to said conduit means for selectively varying reflux pool depth above said contact devices.

6. Structure according to claim 4 wherein steam jet means is disposed proximate a selected one of said downcomer means, for affecting vaporization rate thereat.

7. Structure according to claim 5 wherein said contact devices are provided with respective gate means secured thereat for regulating depth of reflux liquid proximate said reflux liquid inlets, whereby to provide essentially degassed reflux liquid proximate said reflux inlet openings.

8. A column having countercurrent reflux liquid and vapors and gases and including, in combination: a column section having a vertical upward gas-and-vapor flow conduit of rectangular cross-section; a horizontal, rectangular, vapor-and-liquid contact device connected to said conduit and having liquid feed and liquid discharge ends, said conduit being provided with aperture means providing reflux liquid ingress and egress relative to said contact device; and structural means surrounding and affixed to said conduit for creating with said conduit a reservoir pool of reflux liquid above and at said aperture means operatively associated with such ingress, whereby to permit progressively bubble-decay and consequent degassing at a liquid level above said ingress and thus allowing liquid, at a lower level of said reservoir pool, for ingress to and over said contact device.

9. The structure of claim 8 wherein said conduit is provided with adjustable gate means, proximate said aperture means associated with ingress, for regulating reservoir pool depth.

10. A column for ascending vapors, including, in combination: a series of vertically-stacked sections mutually secured together, feed inlet means provided said column, discharge means provided said column, and a series of removable, rectangular, horizontal, vapor-and-liquid contact device means mutually vertically superposed and respectively mounted in and affixed to said sections and preselected, so as to provide for desired inter-device vapor-pressure differential and desired vapor flow rate.

11. A joined series of superposed, vertically stacked column sections for accommodating countercurrent liquids and vapors, each section including, in combination: inner and outer, concentric, mutually-spaced conduits, said inner conduit having a transverse rectangular cross-section; a rectangular vapor-and-liquid contact device horizontally disposed and mounted in said inner conduit; liquid ingress and liquid-and-vapor egress means connected with said contact device at opposite ends thereof; downcomer means disposed between and secured to said inner and outer conduits and connected with said ingress means; and plural means for registering and securing other, exterior, upper and lower column sections to said one section at said inner and outer conduits thereof.

12. A vertical column section for accommodating countercurrent reflux liquid and vapors, comprising: a vertical, rectangular conduit; a horizontal, rectangular, vapor-and-liquid contact device connected with said conduit, said contact device having a reflux liquid ingress end and a reflux liquid egress end provided with a weir, said conduit being provided with a throat connected with said ingress end and a discharge opening connected with said egress end; wall enclosure structure surrounding said conduit; sloping downcomer structure secured to and between said conduit and said wall enclosure structure, said downcomer structure having an upper end, a lower end connected with said throat, and a ramp sloping from said upper end downwardly to said lower end, said downcomer structure comprising a baffle for isolating a space directly above said downcomer structure from the space directly beneath said downcomer, said conduit having a vapor admittance aperture, forming an upper extension of said discharge opening, beneath said downcomer structure and above said weir, for admitting ascending vapors from between said conduit and said wall enclosure structure into the space defined by and within said conduit, said upper end of said downcomer structure being constructed to receive reflux liquid from the section next above, for allowing said reflux liquid to flow downwardly toward said throat.

13. A vertical column for accommodating countercurrent descending reflux liquid and ascending vapors, said column including, in combination: vertical conduit structure having a transverse rectangular cross-section and provided with mutually aligned and vertically spaced reflux liquid throat openings and, side-opposite thereto, a series of mutually aligned and vertically sapced vapor inlet openings, each of said vapor inlet openings having upper portions disposed at respective horizontal levels above corresponding ones of said throat openings; a series of horizontal, rectangular, mutually-vertically-spaced, superposed vapor-and-liquid contact devices, each having a reflux liquid ingress end and a side-opposite reflux liquid egress end provided a weir, secured to and within said conduit structure such that a respective ingress end is contiguous with a respective throat opening, and a corresponding weir of said egress end is connected with a lower portion of said vapor inlet opening, said vapor inlet openings of said conduit structure being constructed to provide for reflux liquid egress from respective ones of said contact devices; wall structure horizontally spaced from, secured to, and surrounding said conduit structure; and plural downwardly sloping downcomer structure disposed between and secured to said wall structure and said conduit structure, representative ones of said downcomer structures having lower portions contiguous with said throat openings and upper portions disposed above corresponding ones of said vapor admittance openings, each of said upper portions being secured beneath the respective, next-above vapor openings for receiving a reflux liquid flow as occurs over the weir of the respective next-above contact device, respective ones of said downcomer structures downwardly curving about said conduit whereby to provide 360° progressive-travel re-directional flow of said reflux liquid as the same cascades from the egress opening of the next-above contact device to the throat opening operatively associated with the next-lower contact device.

* * * * *